(12) United States Patent
Tjader

(10) Patent No.: US 11,022,250 B2
(45) Date of Patent: *Jun. 1, 2021

(54) PIPE SPLITTING APPARATUS WITH REPLACEABLE BLADE

(71) Applicant: TT Technologies, Inc., Aurora, IL (US)

(72) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,964

(22) Filed: Jan. 30, 2020

(65) Prior Publication Data

US 2020/0173600 A1 Jun. 4, 2020

Related U.S. Application Data

(63) Continuation of application No. 15/295,576, filed on Oct. 17, 2016, now Pat. No. 10,571,064, which is a continuation of application No. 14/091,134, filed on Nov. 26, 2013, now Pat. No. 9,470,353, which is a continuation of application No. 13/692,285, filed on Dec. 3, 2012, now Pat. No. 8,596,918, which is a
(Continued)

(51) Int. Cl.
| | |
|---|---|
| *F16L 55/18* | (2006.01) |
| *F16L 55/165* | (2006.01) |
| *B23D 21/02* | (2006.01) |
| *B23D 21/14* | (2006.01) |
| *B26D 3/00* | (2006.01) |
| *B26D 7/26* | (2006.01) |

(52) U.S. Cl.
CPC .............. *F16L 55/18* (2013.01); *B23D 21/02* (2013.01); *B23D 21/14* (2013.01); *B26D 3/001* (2013.01); *B26D 7/2614* (2013.01); *F16L 55/1658* (2013.01); *Y10T 29/4973* (2015.01); *Y10T 83/384* (2015.04)

(58) Field of Classification Search
CPC .............................. F16L 55/1658; F16L 55/18
USPC ....................................................... 405/184.3
See application file for complete search history.

(56) References Cited

U.S. PATENT DOCUMENTS

| | | |
|---|---|---|
| 4,720,211 A | 1/1988 | Streatfield et al. |
| 4,732,222 A | 3/1988 | Schmidt |

(Continued)

OTHER PUBLICATIONS

"U.S. Appl. No. 12/895,304 , Response filed Jun. 27, 2012 to Non Final Office Action dated May 24, 2012", 8 pgs.

(Continued)

*Primary Examiner* — Frederick L Lagman
(74) *Attorney, Agent, or Firm* — Schwegman Lundberg & Woessner, P.A.

(57) ABSTRACT

Pipe splitting apparatuses and systems including a replaceable blade, and methods therefor, are provided. In various examples, a pipe splitting apparatus includes an outer surface including a recess. A blade including a portion is disposed within the recess. A hardenable material is disposed within the recess. The hardenable material is configured to flow upon application to fill empty space within the recess and at least partially around the portion of the blade disposed within the recess. The hardenable material is further configured to harden after application to secure the portion of the blade within the recess and fix the blade to the pipe splitting apparatus.

16 Claims, 16 Drawing Sheets

Related U.S. Application Data continuation of application No. 12/895,304, filed on Sep. 30, 2010, now Pat. No. 8,328,468.

(60) Provisional application No. 61/248,713, filed on Oct. 5, 2009.

(56) References Cited

U.S. PATENT DOCUMENTS

| | | | |
|---|---|---|---|
| 4,738,565 A | | 4/1988 | Streatfield et al. |
| 4,983,071 A | * | 1/1991 | Fisk ................ E21B 7/205 138/97 |
| 5,076,731 A | | 12/1991 | Luksch |
| 5,078,546 A | * | 1/1992 | Fisk ................ E21B 7/205 138/97 |
| 5,192,165 A | * | 3/1993 | Torielli ............ E21B 7/30 138/111 |
| RE35,542 E | | 6/1997 | Fisk et al. |
| 5,782,311 A | | 7/1998 | Wentworth |
| 5,876,152 A | | 3/1999 | Hesse |
| 6,039,505 A | | 3/2000 | Tenbusch, II |
| 6,092,553 A | | 7/2000 | Hodgson |
| 6,305,880 B1 | | 10/2001 | Carter et al. |
| 6,357,967 B1 | | 3/2002 | Putnam |
| 6,382,877 B1 | * | 5/2002 | Hodgson .......... F16L 55/1658 138/97 |
| 6,524,031 B2 | | 2/2003 | Carter et al. |
| 6,755,593 B2 | | 6/2004 | Wentworth et al. |
| 7,172,370 B2 | | 2/2007 | Schmidt |
| 7,891,908 B2 | | 2/2011 | Bruegeman |
| 7,918,626 B2 | | 4/2011 | Venable |
| 8,328,468 B2 | * | 12/2012 | Tjader .............. F16L 55/18 405/184.3 |
| 8,596,918 B2 | * | 12/2013 | Tjader .............. B23D 21/14 405/184.3 |
| 9,103,483 B2 | * | 8/2015 | Tjader .............. F16L 55/1658 |
| 9,360,148 B2 | * | 6/2016 | Herrick ............ F16L 55/1658 |
| 9,470,353 B2 | * | 10/2016 | Tjader .............. B26D 7/2614 |
| 9,885,441 B2 | * | 2/2018 | Tjader .............. F16L 55/18 |
| 10,571,064 B2 | * | 2/2020 | Tjader .............. F16L 55/18 |
| 2001/0018007 A1 | | 8/2001 | Puttmann |
| 2002/0081154 A1 | * | 6/2002 | Herrick ............ F16L 55/18 405/184 |
| 2002/0114671 A1 | * | 8/2002 | Wentworth ......... F16L 55/1658 405/184.3 |
| 2004/0131426 A1 | | 7/2004 | Puttmann |
| 2005/0138815 A1 | | 6/2005 | Schmidt |
| 2007/0036613 A1 | | 2/2007 | Tjader |
| 2008/0181728 A1 | * | 7/2008 | Wentworth ......... F16L 55/1658 405/184.3 |
| 2010/0329793 A1 | | 12/2010 | Tjader |
| 2011/0079126 A1 | | 4/2011 | Tjader |
| 2011/0081205 A1 | | 4/2011 | Tjader |
| 2011/0250020 A1 | | 10/2011 | Carter et al. |
| 2012/0321391 A1 | * | 12/2012 | Herrick ............ F16L 55/1658 405/184.3 |
| 2013/0094911 A1 | | 4/2013 | Tjader et al. |
| 2014/0086689 A1 | | 3/2014 | Tjader |
| 2014/0241812 A1 | * | 8/2014 | Herrick ............ H02G 1/081 405/184 |
| 2017/0030506 A1 | | 2/2017 | Tjader |

OTHER PUBLICATIONS

"U.S. Appl. No. 12/895,304, Non Final Office Action dated May 24, 2012", 6 pgs.

"U.S. Appl. No. 12/895,304, Notice of Allowance dated Aug. 15, 2012", 5 pgs.

"U.S. Appl. No. 13/692,285, Non Final Office Action dated Feb. 4, 2013", 6 pgs.

"U.S. Appl. No. 13/692,285, Notice of Allowance dated Jul. 18, 2013", 6 pgs.

"U.S. Appl. No. 13/692,285, Response filed May 5, 2013 to Non Final Office Action dated Feb. 4, 2013", 8 pgs.

"U.S. Appl. No. 14/091,134, Advisory Action dated Jun. 25, 2015", 3 pgs.

"U.S. Appl. No. 14/091,134, Final Office Action dated Mar. 24, 2015", 5 pgs.

"U.S. Appl. No. 14/091,134, Final Office Action dated Apr. 5, 2016", 6 pgs.

"U.S. Appl. No. 14/091,134, Final Office Action dated Jul. 15, 2014", 5 pgs.

"U.S. Appl. No. 14/091,134, Non Final Office Action dated Jan. 3, 2014", 6 pgs.

"U.S. Appl. No. 14/091,134, Non Final Office Action dated Sep. 11, 2015", 6 pgs.

"U.S. Appl. No. 14/091,134, Non Final Office Action dated Sep. 30, 2014", 5 pgs.

"U.S. Appl. No. 14/091,134, Notice of Allowance dated Jun. 15, 2016", 5 pgs.

"U.S. Appl. No. 14/091,134, Response filed Jan. 13, 2016 to Non-Final Office Action dated Sep. 11, 2015", 7 pgs.

"U.S. Appl. No. 14/091,134, Response filed May 5, 2014 to Non Final Office Action dated Jan. 3, 2014", 7 pgs.

"U.S. Appl. No. 14/091,134, Response filed Jun. 11, 2015 to Final Office Action dated Mar. 24, 2015", 7 pgs.

"U.S. Appl. No. 14/091,134, Response filed Sep. 11, 2014 to Final Office Action dated Jul. 15, 2014", 8 pgs.

"U.S. Appl. No. 14/091,134, Response filed Dec. 30, 2014 to Non Final Office Action dated Sep. 30, 2014", 7 pgs.

"U.S. Appl. No. 14/091,134, Response filed Jun. 2, 2016 to Final Office Action dated Apr. 5, 2016", 7 pgs.

"U.S. Appl. No. 15/295,576, Advisory Action dated Oct. 11, 2017", 3 pgs.

"U.S. Appl. No. 15/295,576, Advisory Action dated Dec. 4, 2018", 3 pgs.

"U.S. Appl. No. 15/295,576, Final Office Action dated Jul. 19, 2017", 7 pgs.

"U.S. Appl. No. 15/295,576, Final Office Action dated Sep. 18, 2018", 8 pgs.

"U.S. Appl. No. 15/295,576, Non Final Office Action dated Feb. 10, 2017", 9 pgs.

"U.S. Appl. No. 15/295,576, Non Final Office Action dated Feb. 27, 2018", 7 pgs.

"U.S. Appl. No. 15/295,576, Non Final Office Action dated Apr. 26, 2019", 10 pgs.

"U.S. Appl. No. 15/295,576, Notice of Allowance dated Oct. 24, 2019", 5 pgs.

"U.S. Appl. No. 15/295,576, Preliminary Amendment filed Oct. 18, 2016", 6 pgs.

"U.S. Appl. No. 15/295,576, Response filed Jan. 18, 2018 to Final Office Action dated Jul. 19, 2017", 8 pgs.

"U.S. Appl. No. 15/295,576, Response filed Nov. 19, 2018 to Final Office Action dated Sep. 18, 2018", 8 pgs.

"U.S. Appl. No. 15/295,576, Response filed May 10, 2017 to Non-Final Office Action dated Feb. 10, 2017", 9 pgs.

"U.S. Appl. No. 15/295,576, Response filed Jun. 27, 2018 to Non-Final Office Action dated Feb. 27, 2018", 9 pgs.

"U.S. Appl. No. 15/295,576, Response filed Jul. 25, 2019 to Non-Final Office Action dated Apr. 26, 2019", 8 pgs.

"U.S. Appl. No. 15/295,576, Response filed Sep. 19, 2017 to Final Office Action mailed Jul. 19, 2017", 8 pgs.

* cited by examiner

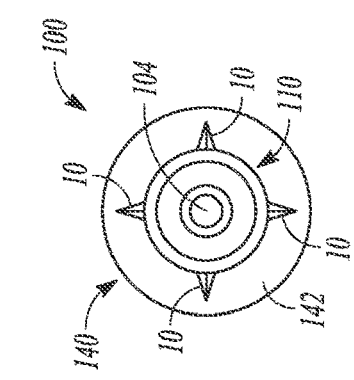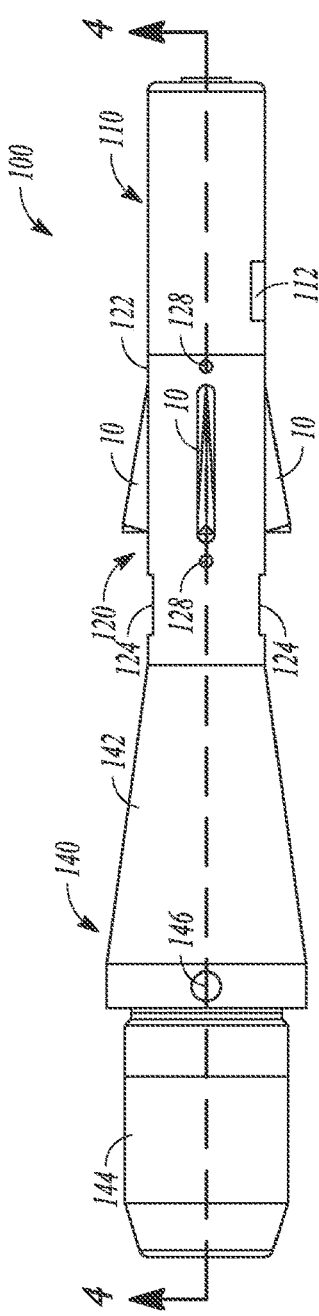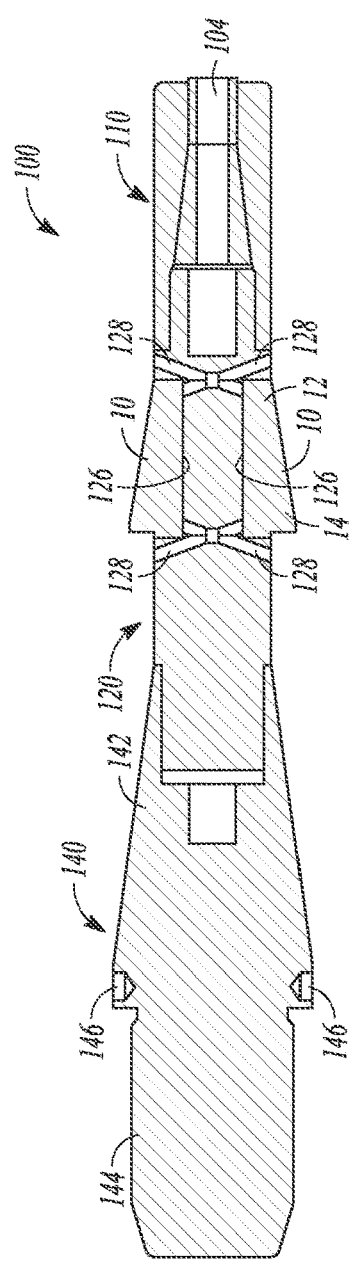

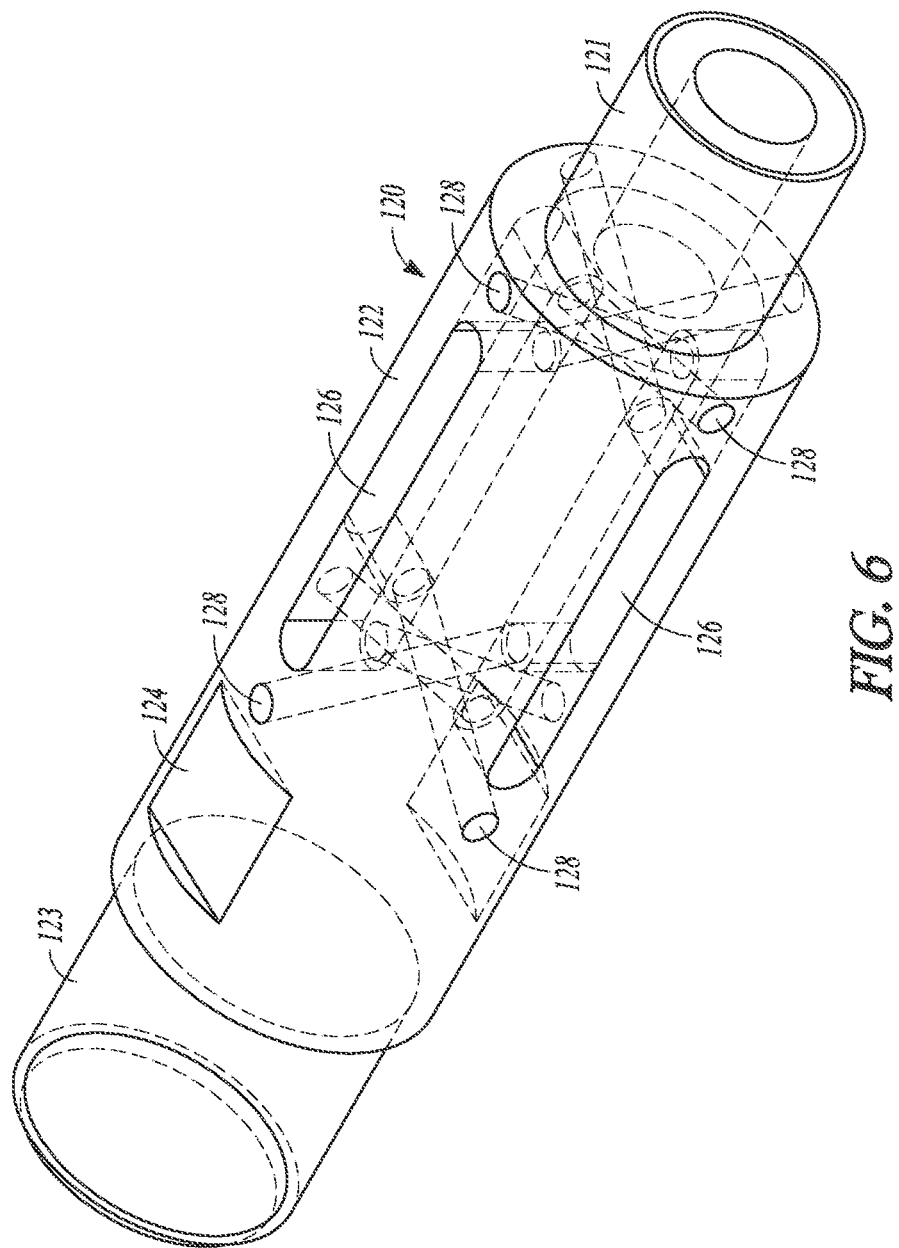

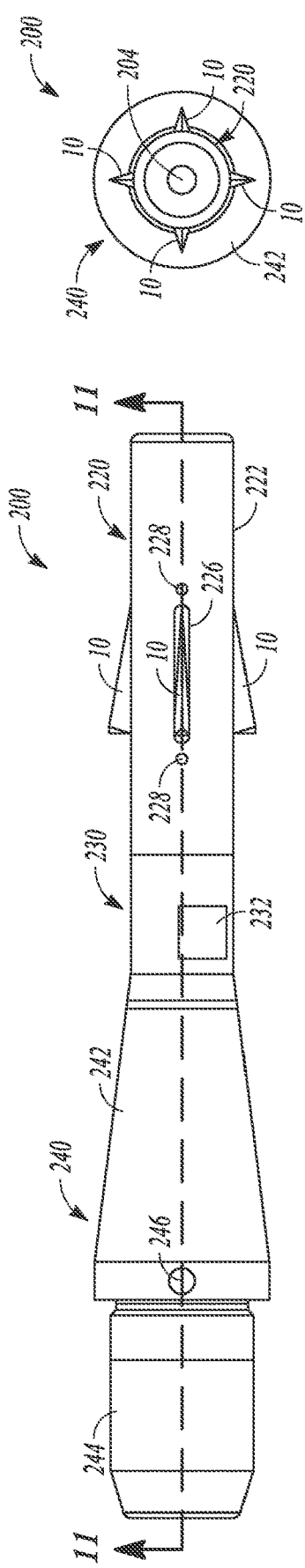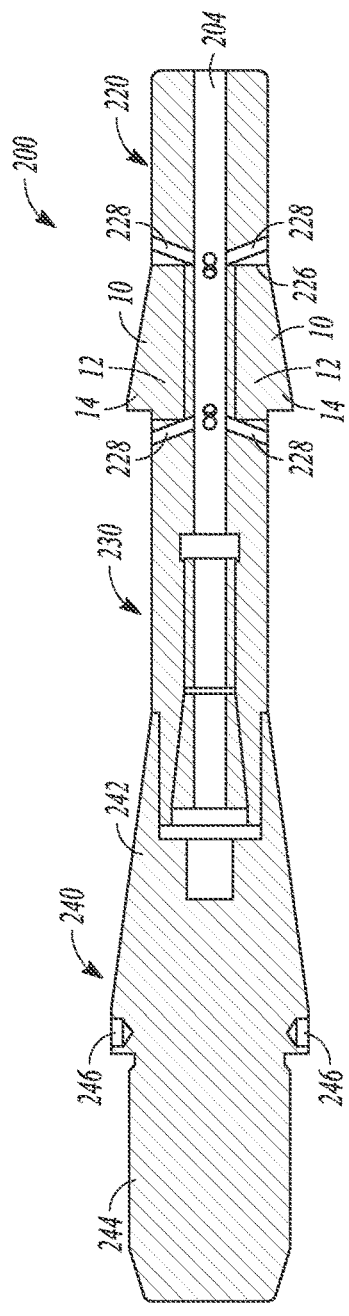

US 11,022,250 B2

PIPE SPLITTING APPARATUS WITH REPLACEABLE BLADE

RELATED APPLICATIONS

This patent application is a continuation of U.S. patent application Ser. No. 15/295,576, filed Oct. 17, 2016 and issued on Feb. 25, 2020 as U.S. Pat. No. 10,571,064, which is a continuation of U.S. patent application Ser. No. 14/091,134, filed Nov. 26, 2013 and issued on Oct. 18, 2016 as U.S. Pat. No. 9,470,353, which is a continuation of U.S. patent application Ser. No. 13/692,285, filed Dec. 3, 2012 and issued on Dec. 3, 2013 as U.S. Pat. No. 8,596,918, which is a continuation of and claims the benefit of priority to U.S. patent application Ser. No. 12/895,304, filed on Sep. 30, 2010 and issued on Dec. 11, 2012 as U.S. Pat. No. 8,328,468, which claims the benefit of priority to U.S. Provisional Patent Application Ser. No. 61/248,713, filed on Oct. 5, 2009, all of which are incorporated herein by reference in their entirety.

TECHNICAL FIELD

This patent document pertains generally to pipe splitting and more particularly, but not by way of limitation, to a pipe splitting apparatus with a replaceable blade.

BACKGROUND

Pipe, such as plastic, copper, lead pipe, and the like, has been used for connecting homes to and creating networks for utilities, for instance, water, sewage, and natural gas. As pipes become older, they break down, crack, develop scaling on interior surfaces that can clog the pipe, and the like and thereby require replacement.

A technique known as pipe bursting is currently used as a convenient method to replace underground pipe without the need to completely excavate the pipe needing replacement. A pipe breaking device, such as an expander or a mole, is pulled by a cable through the existing pipe while it is still underground. The expander is designed to break, split or burst the pipe, and at the same time push the old pipe into the surrounding soil. The expansion of the old pipe allows the expander to pull a replacement pipe into place.

In one example, pipe splitters include one or more blades extending from an outer surface of a pipe splitter section. The one or more blades can be used to split or aid in splitting the pipe. Over time, the one or more blades can become worn and less effective at splitting or aiding in splitting the pipe. Over enough time and use, the one or more blades can become so worn and ineffective as to require replacement, at which point the entire pipe splitter section would have to be replaced. Such pipe splitter sections can be relatively difficult and/or relatively expensive to machine or otherwise manufacture.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 3 is a side elevational view of the pipe splitter of FIG. 1;

FIG. 4 is a cross-sectional view of the pipe splitter of FIG. 1, the cross section taken along line 4-4 in FIG. 3;

FIG. 5 is a front elevational view of the pipe splitter of FIG. 1;

FIG. 6 is a perspective view of an example of a blade portion of a pipe splitter with replaceable blades removed;

FIG. 10 is a side elevational view of an example of a pipe splitter including a blade portion with replaceable blades;

FIG. 11 is a cross-sectional view of the pipe splitter of FIG. 10, the cross section taken along line 11-11 in FIG. 10;

FIG. 12 is a front elevational view of the pipe splitter of FIG. 10;

DESCRIPTION OF THE EMBODIMENTS

The present inventor has recognized, among other things, that it is desirable to provide a pipe splitting apparatus including one or more replaceable blades to enable one to replace one or more blades after an amount of time and/or once the one or more blades have reached a particular amount of wear. In this way, a user can replace just the one or more blades rather than having to replace the entire pipe splitting apparatus. Replacement of one or more blades can result in less downtime and/or less expense than the replacement of the entire pipe splitting apparatus.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In the following description, the term cable is defined to include metal cables, wire rope, or other lengths of flexible line of suitable strength to pull devices as described below through a section of pipe. These embodiments are described in sufficient detail to enable those skilled in the art to practice the invention. Other embodiments may be utilized and structural, or logical changes, etc. may be made without departing from the scope of the present invention.

Figure 1:
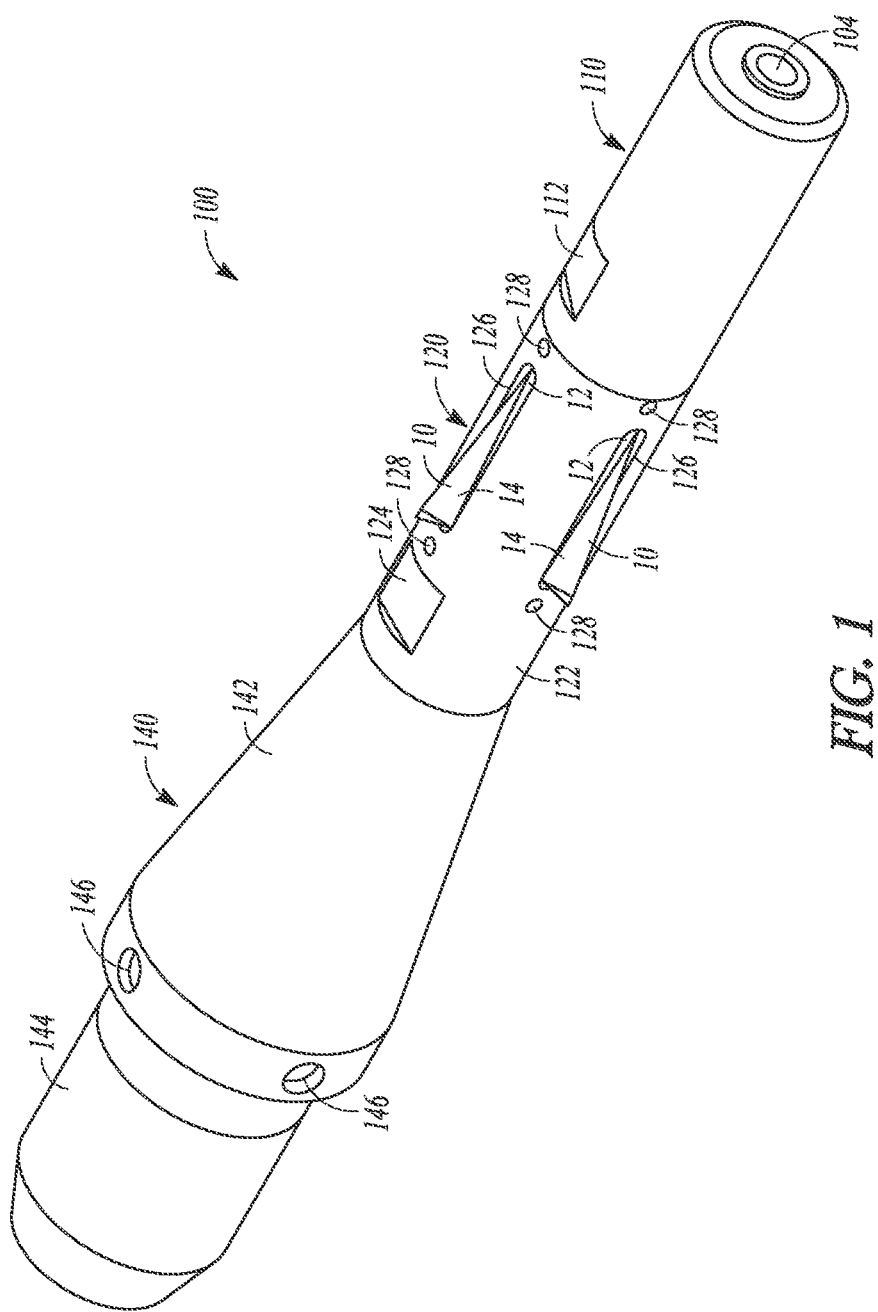
FIG. 1 is a perspective view of an example of a pipe splitter including a blade portion with replaceable blades.
Figure 2:
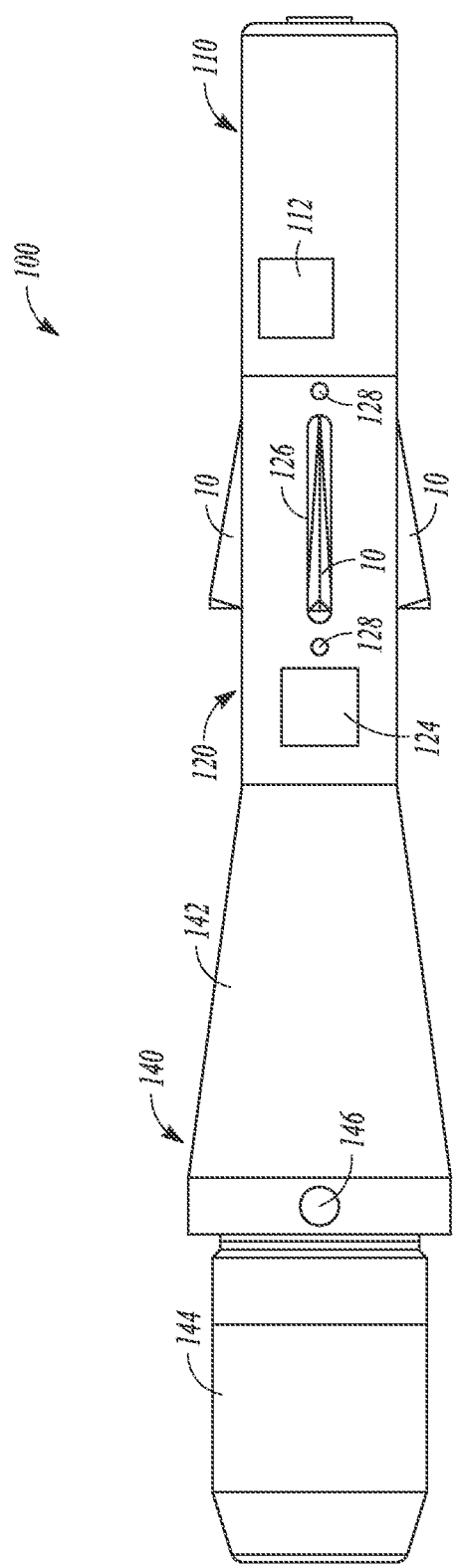
FIG. 2 is a top plan view of the pipe splitter of FIG. 1.
Figure 9:
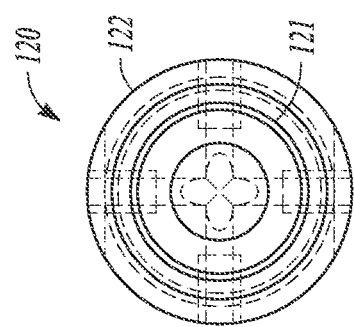
FIG. 9 is a front elevational view of the blade portion of FIG. 6.
Figure 7:
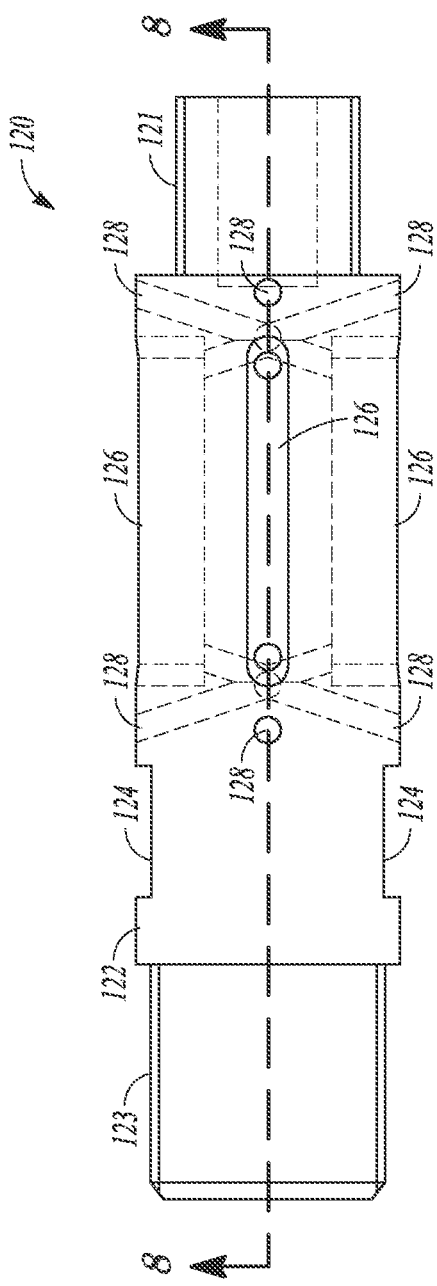
FIG. 7 is a side elevational view of the blade portion of FIG. 6.
Figure 8:
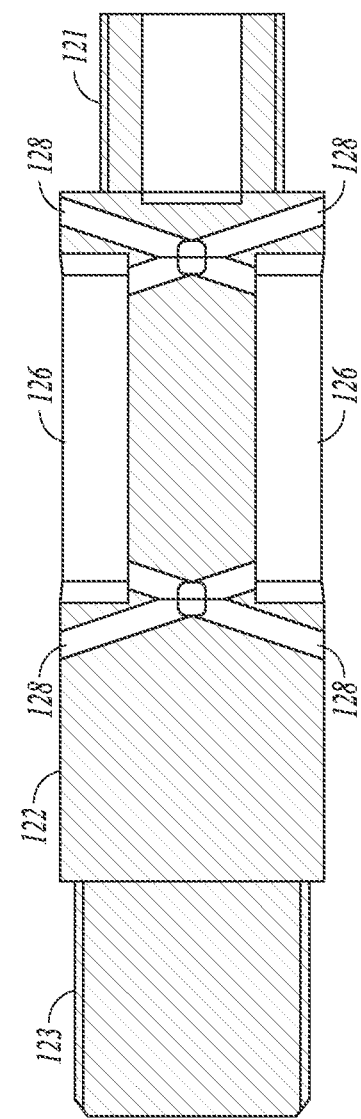
FIG. 8 is a cross-sectional view of the blade portion of FIG. 6, the cross section taken along line 8-8 in FIG. 7.
Figure 17:
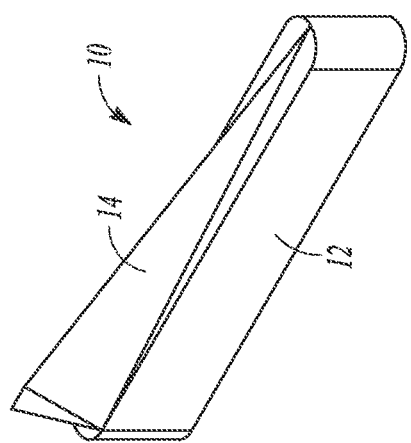
FIG. 17 is a perspective view of an example of a replaceable blade of a pipe splitter.
Figure 20:
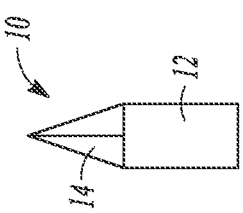
FIG. 20 is a front elevational view of the replaceable blade of FIG. 17.
Figure 19:
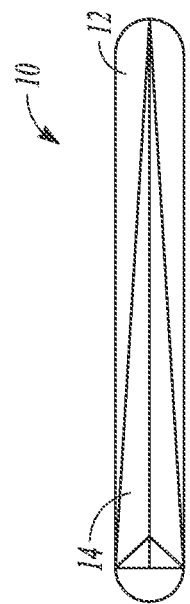
FIG. 19 is a top plan view of the replaceable blade of FIG. 17.
Figure 18:
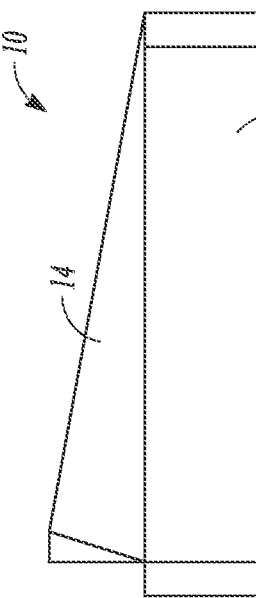
FIG. 18 is a side elevational view of the replaceable blade of FIG. 17.

Referring to FIGS. 1-9 and 17-20, an example pipe splitting apparatus 100 is shown. In the example shown, the pipe splitting apparatus 100 includes a front segment 110, a pilot segment 120, and a nose segment 140. In various examples, one or more of these segments 110, 120, 140 can be used in various combinations and/or used with other types of segments. The pipe splitting apparatus 100, in an example, can be coupled to a pneumatic hammer segment, for instance, with a threaded portion 144 of the nose segment 140. The pneumatic hammer segment can be used to assist in urging the pipe splitting apparatus 100 through an existing underground pipe or conduit to be replaced. In an example, the pneumatic hammer segment can be used in addition to pulling the pipe splitting apparatus 100 with a wire or cable extending from a cable passage 104 of the front segment 110.

In an example, the front segment 110 is threadably engaged with a first threaded portion 121 of the pilot segment 120. In an example, the front segment 110 includes flats 112 in an outer surface to allow a tool, such as a spanner, to be used to couple and uncouple the front segment 110 and the pilot segment 120. In various examples, the nose segment 140 is threadably engaged with a second threaded portion 123 of the pilot segment 120. In an example, the pilot segment 120 includes flats 124 in an outer surface 122 to allow a tool, such as a spanner, to be used to couple and uncouple the pilot segment 120 and the nose segment 140. As will be described in more detail below, the pilot segment 120 includes one or more blades 10 extending from the outer surface 122 of the pilot segment 120, the one or more blades 10 being configured to bear against and cut, score, or otherwise deform the pipe or conduit being replaced. In an example, the outer surface 122 of the pilot segment 120 is elongate. In a further example, the outer surface 122 is substantially tubular.

In an example, the nose segment 140 includes an expander portion 142, which, in this example, substantially conically expands from a first diameter similar to that of the pilot segment 120 to a second larger diameter, for instance, similar to that of the pneumatic hammer segment. The second diameter, in an example, is large enough to accommodate a replacement pipe or conduit to be advanced. The expander portion 142 functions to further split and/or displace outwardly the existing pipe to allow the replacement pipe or conduit to be advanced through the space previously occupied by the pipe or conduit being replaced. In an example, the nose segment 140 includes one or more receptacles 146 configured to accept one or more cutting blades. In an example, the one or more blades are removably engageable within the one or more receptacles 146. In an example, the one or more cutting blades are carbide blades. The one or more blades are configured to assist in widening the space previously occupied by further forcing the pipe or conduit being replaced outwardly and/or by further cutting, scoring, deforming, or scraping the pipe or conduit being replaced.

In various examples, the pilot segment 120 includes one or more recesses 126 in the outer surface 122 configured to receive a corresponding number of blades 10 therein. In an example, the pilot segment 120 includes four recesses 126 to receive four blades 10. In some examples, the pilot segment 120 includes fewer than four recesses 126 or more than four recesses 126. The number of recesses 126 and corresponding blades 10 is dependent on various factors, including the material of the pipe or conduit being replaced, the properties of the ground through which the pipe or conduit being replaced is situated (such as the hardness, type of soil, amount of rocks, etc.), the material properties of the one or more blades 10 being used, etc. In an example, the blades 10 and corresponding recesses 126 are diametrically opposed to each other around the outer surface 122 of the pilot segment 120.

In various examples, the one or more recesses 126 of the pilot segment 120 are each configured to accept a bottom portion 12 of the blade 10. In an example, the bottom portion 12 is sized and shaped to fit within the recess 126 so that a top surface of the bottom portion is substantially flush with the outer surface 122 of the pilot segment 120 and a cutting portion 14 of the blade 10 extends outwardly from the outer surface 126 of the pilot segment 120. In an example, the one or more recesses 126 are elongate. In a further example, the one or more elongate recesses 126 are oriented to extend substantially longitudinally within the outer surface 122 of the pilot segment 120. In another example, the one or more recesses 126 are oriented so that the cutting portion 14 of each of the blades 10 extends substantially longitudinally along the pilot segment 120.

In an example, the one or more blades 10 fit snugly within the one or more recesses 126. In another example, the one or more blades 10 fit within the one or more recesses 126 with an amount of play between the blade 10 and the corresponding recess 126. In a further example, a hardenable material is disposed within the recess 126 and at least partially around the bottom portion 12 of the blade 10 disposed within the recess 126 to fix the blade 10 within the recess 126. The hardenable material, in an example, is configured to flow upon application. In an example, the hardenable material is configured to harden after application to secure the bottom portion 12 of the blade 10 within the recess 126 and fix the blade 10 to the pipe splitting apparatus 100. In an example, the hardenable material includes an adhesive. In another example, the hardenable material includes Loctite®. In still another example, the hardenable material includes an epoxy. In still another example, the hardenable material is solder. In this example, the solder is heated to apply the solder between the blade 10 and the recess 126. The solder acts to fix the blade 10 within the recess 126 as the solder cools and hardens. To remove the blade 10, the area of the blade 10 and recess 126 can be heated to soften the solder in order to facilitate the removal of the blade 10 from within the recess 126. In other examples, the hardenable material includes any substance capable of fixing or otherwise retaining the blade 10 within the recess 126.

In a further example, the blade 10 and the recess 126 are machined so that there is a tight tolerance between substantially vertical sidewalls of the recess 126 and corresponding substantially vertical sidewalls of the bottom portion 12 of the blade 10. With the blade 10 inserted within the recess 126, during pipe splitting operations, the sidewalls of the blade 10 bear against the sidewalls of the recess 126, such that a majority of the forces are borne by the abutting sidewalls of the blade 10 and the recess 126. In this way, the hardenable material acts primarily to hold the blade 10 within the recess 126 and bears little, if any, of the forces incurred by the blade 10 during pipe splitting operations. In an example, the bottom portion 12 of the blade 10 has a height and/or length sufficient to provide a sufficient surface area to bear the forces incurred during pipe splitting operations.

In this way, the hardenable material acts to retain each of the blades 10 within each of the recesses 126 during the useful life of each of the blades 10 or otherwise until a user decides to replace the one or more blades 10. Also, if one or more blades 10 happen to become loose prior to the user wanting to replace them, more hardenable material can be applied to the one or more blades 10 to again fix the one or more blades 10 within the corresponding recess 126.

After an amount of time, as the one or more blades 10 have reached a particular amount of wear, and/or if a blade of a different configuration is desired, the one or more blades 10 can be replaced without having to replace the entire pilot segment 120. That is, each of the blades 10 to be replaced can be removed from the recess 126 and a new, unworn, or otherwise different blade 10 can be fixed within the recess 126 in order to continue usage of the pilot segment 120 and the pipe splitting apparatus 100. In an example, the pilot segment 120 includes an elongate passage 128 extending through the outer surface 122 to a portion of the recess 126 to aid in dislodging or otherwise removing the blade 10 fixed within the recess 126. In an example, the elongate passage 128 extends to a bottom of the recess 126, such that a bottom of the bottom portion 12 of the blade 10 is accessible. In an example, the elongate passage 128 runs from the recess 126 to the outer surface 122 of the pilot segment 120. In a further example, the opening of the elongate passage 128 is disposed in a portion of the outer surface 122 substantially opposed to the recess 126 to which the elongate passage 128 leads. In this way, an elongate tool, such as a rod, can be inserted through the elongate passage 128 to contact the bottom portion 14 of the blade 10 fixed within the recess 126. Force, such as percussive force from a hammer, pneumatic or manual, or constant force from a press, can be applied to break the bond of the hardenable material between the blade 10 and the recess 126 to dislodge and remove the blade 10 from within the recess 126. In an example, more than one elongate passage 128 are included through the pilot segment 120 for each recess 126. In the example shown in FIGS. 1-8, two elongate passages 128 are included for each recess 126. In this way, the user is able to apply force the blade 10 at different locations along the bottom portion 12 to urge the blade 10 out of the recess 126. Once the blade 10 to be replaced is removed, another blade 10 can be fixed within the recess 126 using hardenable material.

Figure 13:
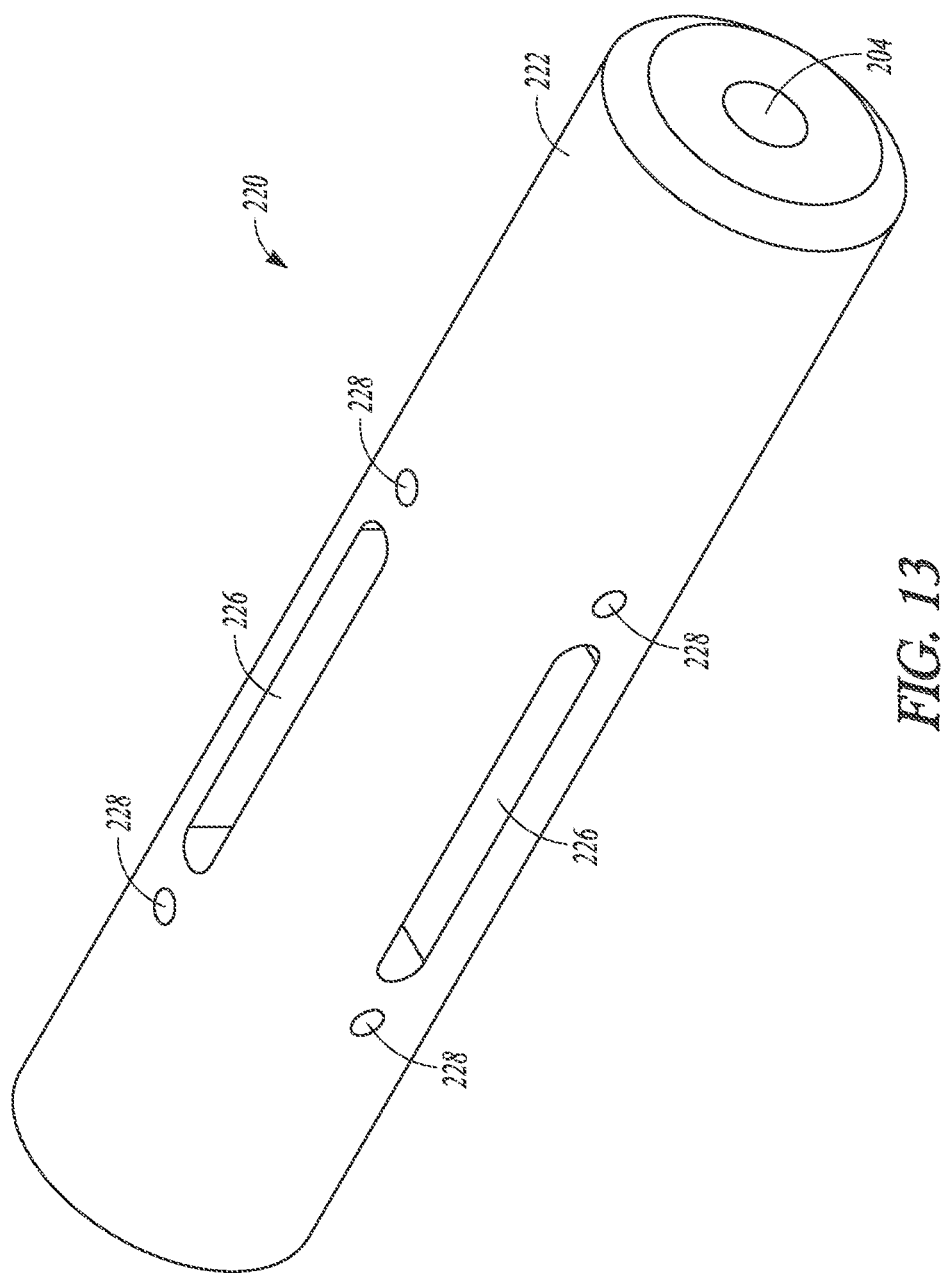
FIG. 13 is a perspective view of an example of a blade portion of a pipe splitter with replaceable blades removed.
Figure 16:
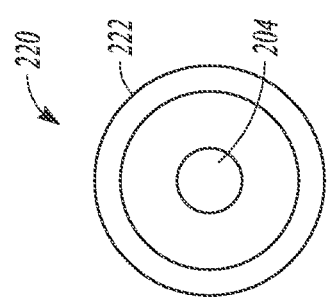
FIG. 16 is a front elevational view of the blade portion of FIG. 13.
Figure 14:
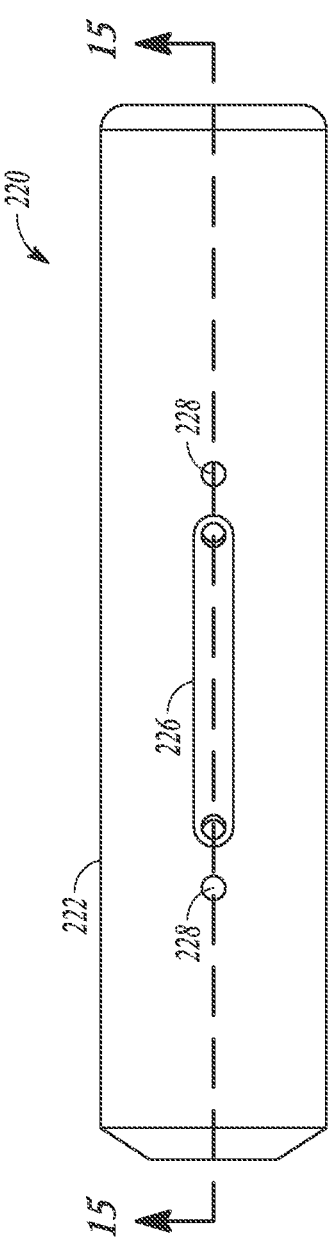
FIG. 14 is a side elevational view of the blade portion of FIG. 13.
Figure 15:
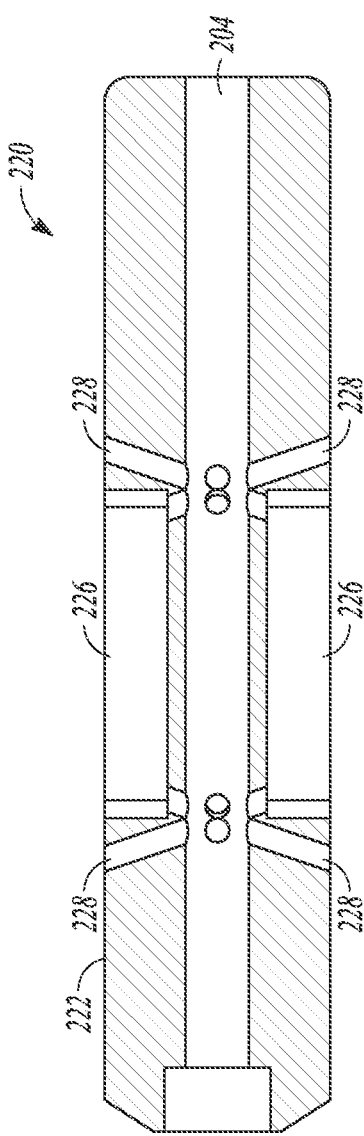
FIG. 15 is a cross-sectional view of the blade portion of FIG. 13, the cross section taken along line 15-15 in FIG. 14.

In other examples, replaceable blades 10 can be used with segments other than or in addition to the pilot segment 120 described above. For instance, with reference to FIGS. 10-16, a pipe splitting apparatus 200 is shown having a pilot segment 220 with replaceable blades 10. The pipe splitting apparatus 200 includes the pilot segment 220, a segment cartridge 230, and a nose segment 240. In this example, the pilot segment 220 is disposed at the front of the pipe splitting apparatus 200 and includes a cable passage 204 at a front end of the pilot segment 220 from which a wire or cable extends during a pulling operation. The segment cartridge 230 is coupled at a proximal end of the pilot segment 220. A proximal portion of the segment cartridge 230 is threadably engaged to the nose segment 240. In an example, the segment cartridge 230 includes flats 232 in an outer surface to allow a tool, such as a spanner, to be used to couple and uncouple the segment cartridge 230 and the nose segment 240. In various examples, one or more of these segments 220, 230, 240 can be used in various combinations and/or used with other types of segments. The pipe splitting apparatus 200, in an example, can be coupled to a pneumatic hammer segment, for instance, with a threaded portion 244 of the nose segment 240. The pneumatic hammer segment can be used to assist in urging the pipe splitting apparatus 200 through an existing underground pipe or conduit to be replaced. In an example, the pneumatic hammer segment can be used in addition to pulling the pipe splitting apparatus 200 with the wire or cable extending from the cable passage 204 of the pilot segment 220.

In an example, the nose segment 240 includes an expander portion 242, which, in this example, substantially conically expands from a first diameter similar to that of the segment cartridge 230 to a second larger diameter, for instance, similar to that of the pneumatic hammer segment. The second diameter, in an example, is large enough to accommodate a replacement pipe or conduit to be advanced. The expander portion 242 functions to further split and/or displace outwardly the existing pipe to allow the replacement pipe or conduit to be advanced through the space previously occupied by the pipe or conduit being replaced. In an example, the nose segment 240 includes one or more receptacles 246 configured to accept one or more cutting blades. In an example, the one or more blades are removably engageable within the one or more receptacles 246. In an example, the one or more cutting blades are carbide blades. The one or more blades are configured to assist in widening the space previously occupied by further forcing the pipe or conduit being replaced outwardly and/or by further cutting, scoring, deforming, or scraping the pipe or conduit being replaced.

In various examples, the pilot segment 220 includes one or more recesses 226 in an outer surface 222 configured to receive a corresponding number of blades 10 therein. In an example, the pilot segment 220 includes four recesses 226 to receive four blades 10. In some examples, the pilot segment 220 includes fewer than four recesses 226 or more than four recesses 226. The number of recesses 226 and corresponding blades 10 are dependent on various factors, including the material of the pipe or conduit being replaced, the properties of the ground through which the pipe or conduit being replaced is situated (such as the hardness, type of soil, amount of rocks, etc.), the material properties of the one or more blades 10 being used, etc. In an example, the blades 10 and corresponding recesses 226 are diametrically opposed to each other around the outer surface 222 of the pilot segment 220.

In various examples, the one or more recesses 226 of the pilot segment 220 are each configured to accept the bottom portion 12 of the blade 10. In an example, the bottom portion 12 is sized and shaped to fit within the recess 226 so that a top surface of the bottom portion is substantially flush with the outer surface 222 of the pilot segment 220 and the cutting portion 14 of the blade 10 extends outwardly from the outer surface 226 of the pilot segment 220. In an example, the one or more recesses 226 are elongate. In a further example, the one or more elongate recesses 226 are oriented to extend substantially longitudinally within the outer surface 222 of the pilot segment 220. In another example, the one or more recesses 226 are oriented so that the cutting portion 14 of each of the blades 10 extends substantially longitudinally along the pilot segment 220.

In an example, the one or more blades 10 fit snugly within the one or more recesses 226. In another example, the one or more blades 10 fit within the one or more recesses 226 with an amount of play between the blade 10 and the corresponding recess 226. In a further example, a hardenable material is disposed within the recess 226 and at least partially around the bottom portion 12 of the blade 10 disposed within the recess 226 to fix the blade 10 within the recess 226. The hardenable material, in an example, is configured to flow upon application. In an example, the hardenable material is configured to harden after application to secure the bottom portion 12 of the blade 10 within the recess 226 and fix the blade 10 to the pipe splitting apparatus 200. In an example, the hardenable material includes an adhesive. In another example, the hardenable material includes Loctite®. In still another example, the hardenable material includes an epoxy. In still another example, the hardenable material is solder. In this example, the solder is heated to apply the solder between the blade 10 and the recess 226. The solder acts to fix the blade 10 within the recess 226 as the solder cools and hardens. To remove the blade 10, the area of the blade 10 and recess 226 can be heated to soften the solder in order to facilitate the removal of the blade 10 from within the recess 226. In other examples, the hardenable material includes any substance capable of fixing or otherwise retaining the blade 10 within the recess 226.

In a further example, the blade 10 and the recess 226 are machined so that there is a tight tolerance between substantially vertical sidewalls of the recess 226 and corresponding substantially vertical sidewalls of the bottom portion 12 of the blade 10. With the blade 10 inserted within the recess 226, during pipe splitting operations, the sidewalls of the blade 10 bear against the sidewalls of the recess 226, such that a majority of the forces are borne by the abutting sidewalls of the blade 10 and the recess 226. In this way, the hardenable material acts primarily to hold the blade 10 within the recess 226 and bears little, if any, of the forces incurred by the blade 10 during pipe splitting operations. In an example, the bottom portion 12 of the blade 10 has a height and/or length sufficient to provide a sufficient surface area to bear the forces incurred during pipe splitting operations.

In this way, the hardenable material acts to retain each of the blades 10 within each of the recesses 226 during the useful life of each of the blades 10 or otherwise until a user decides to replace the one or more blades 10. Also, if one or more blades 10 happen to become loose prior to the user wanting to replace them, more hardenable material can be applied to the one or more blades 10 to again fix the one or more blades 10 within the corresponding recess 226.

After an amount of time, as the one or more blades 10 have reached a particular amount of wear, and/or if a blade of a different configuration is desired, the one or more blades 10 can be replaced without having to replace the entire pilot segment 220. That is, each of the blades 10 to be replaced can be removed from the recess 226 and a new, unworn, or otherwise different blade 10 can be fixed within the recess 226 in order to continue usage of the pilot segment 220 and the pipe splitting apparatus 200. In an example, the pilot segment 220 includes an elongate passage 228 extending through the outer surface 222 to a portion of the recess 226 to aid in dislodging or otherwise removing the blade 10 fixed within the recess 226. In an example, the elongate passage 228 extends to a bottom of the recess 226, such that a bottom of the bottom portion 12 of the blade 10 is accessible. In an example, the elongate passage 228 runs from the recess 226 to the outer surface 222 of the pilot segment 220. In a further example, the opening of the elongate passage 228 is disposed in a portion of the outer surface 222 substantially opposed to the recess 226 to which the elongate passage 228 leads. In this way, an elongate tool, such as a rod, can be inserted through the elongate passage 228 to contact the bottom portion 14 of the blade 10 fixed within the recess 226. Force, such as percussive force from a hammer, pneumatic or manual, or constant force from a press, can be applied to break the bond of the hardenable material between the blade 10 and the recess 226 to dislodge and remove the blade 10 from within the recess 226. In an example, more than one elongate passage 228 are included through the pilot segment 220 for each recess 226. In the example shown in FIGS. 10-16, two elongate passages 228 are included for each recess 226. In this way, the user is able to apply force the blade 10 at different locations along the bottom portion 12 to urge the blade 10 out of the recess 226.

Once the blade 10 to be replaced is removed, another blade 10 can be fixed within the recess 226 using hardenable material.

Figure 21:
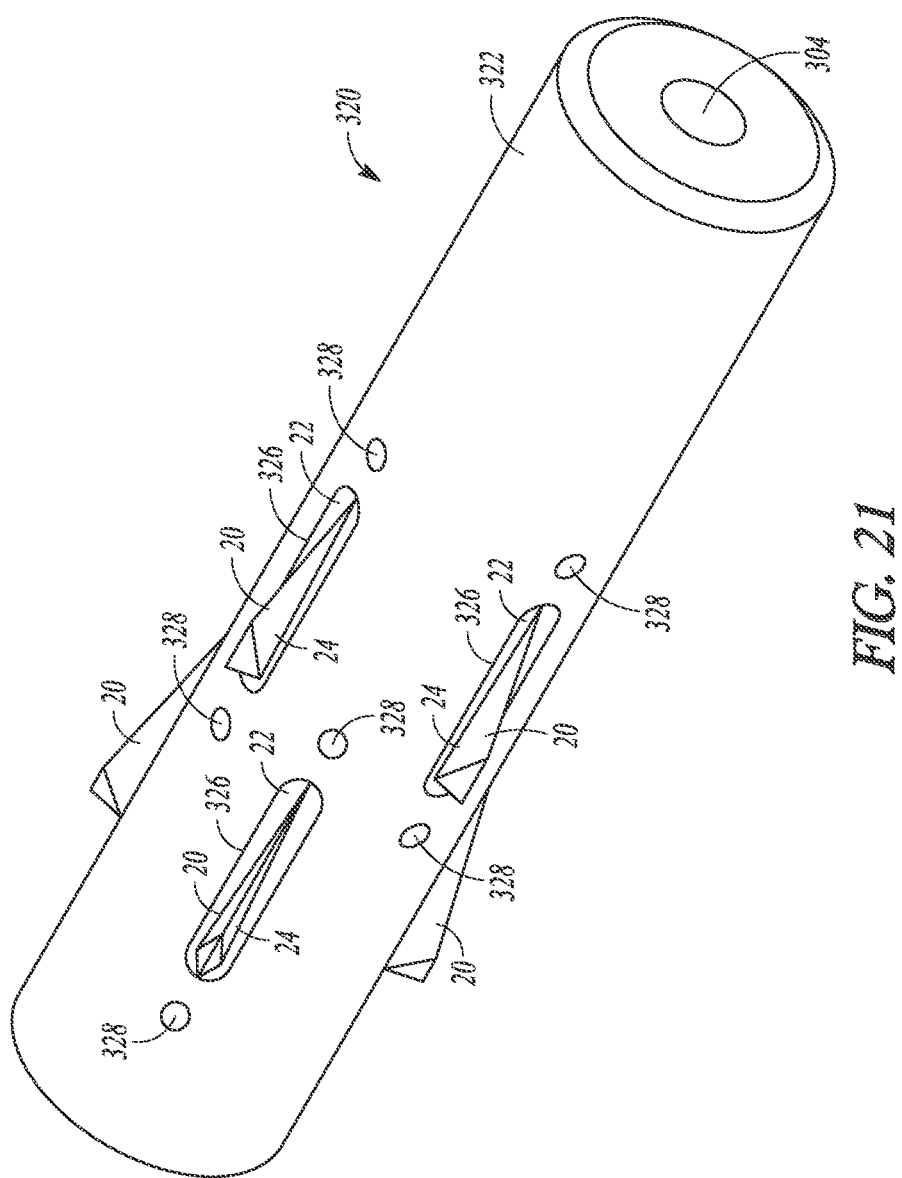
FIG. 21 is a perspective view of an example of a blade portion of a pipe splitter with replaceable blades installed.
Figure 24:
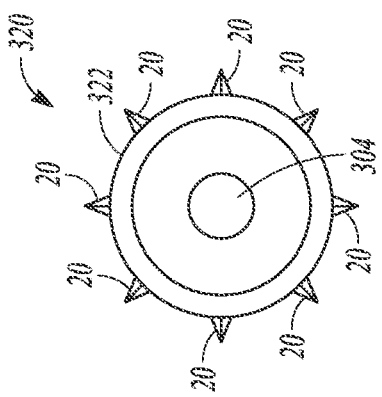
FIG. 24 is a front elevational view of the blade portion of FIG. 21.
Figure 22:
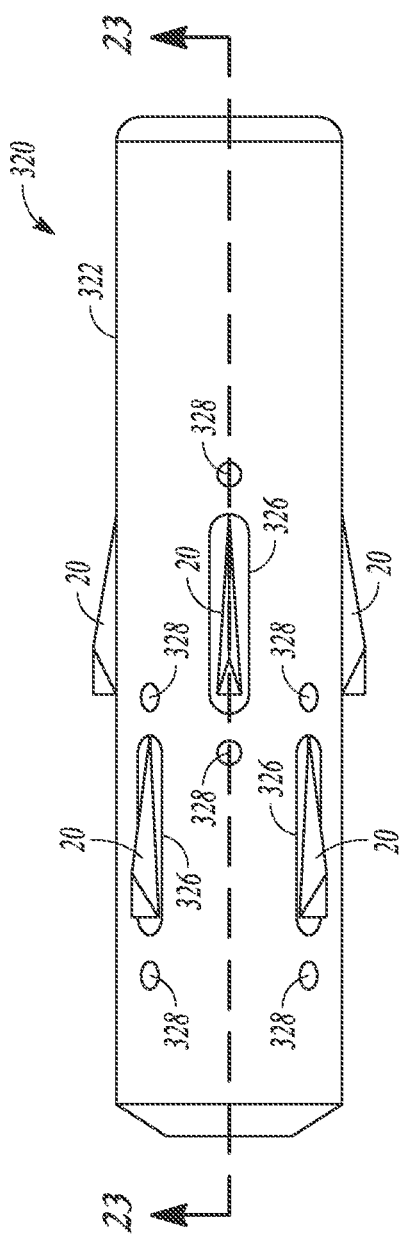
FIG. 22 is a side elevational view of the blade portion of FIG. 21.
Figure 23:
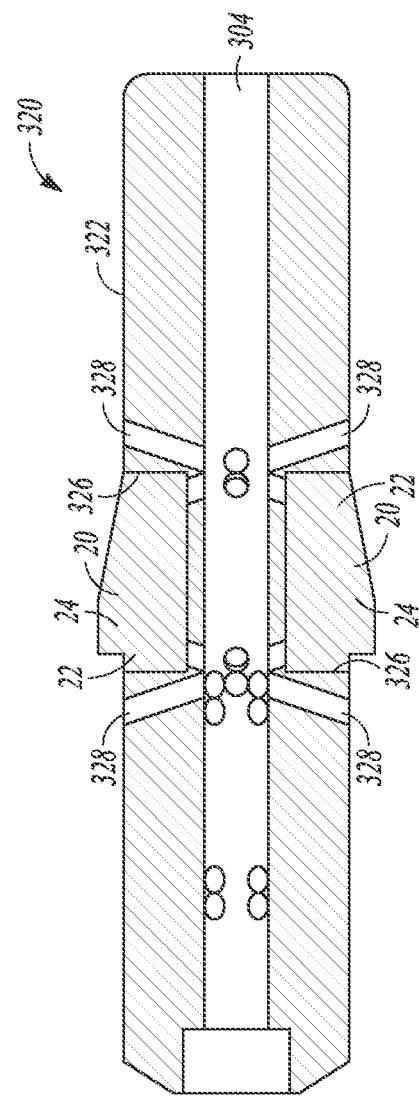
FIG. 23 is a cross-sectional view of the blade portion of FIG. 21, the cross section taken along line 23-23 in FIG. 22.
Figure 25:
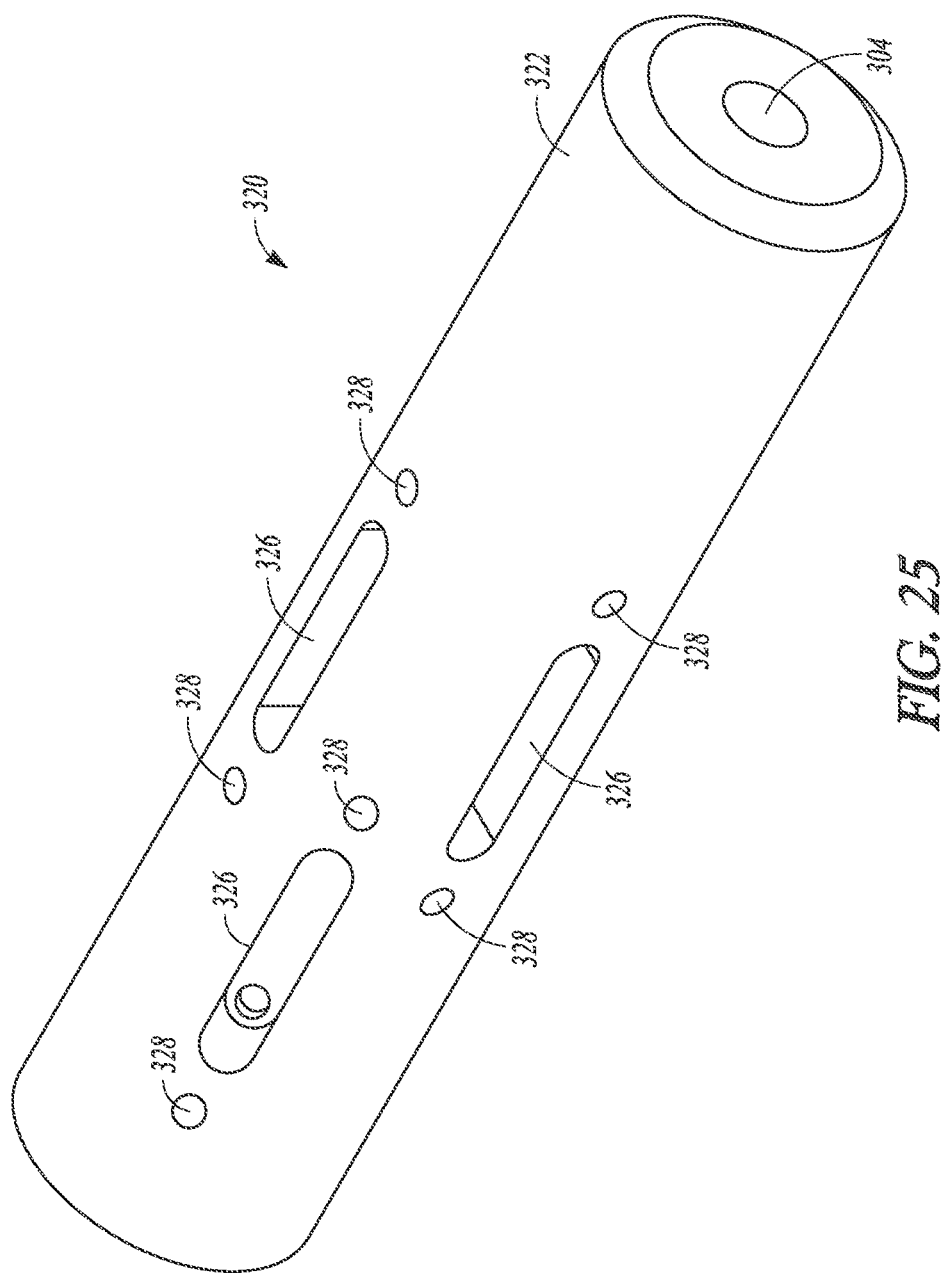
FIG. 25 is a perspective view of an example of a blade portion of a pipe splitter with replaceable blades removed.
Figure 28:
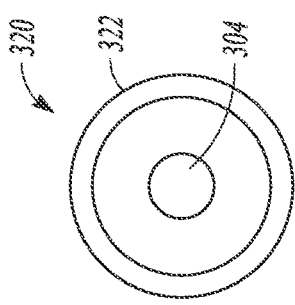
FIG. 28 is a front elevational view of the blade portion of FIG. 25.
Figure 26:
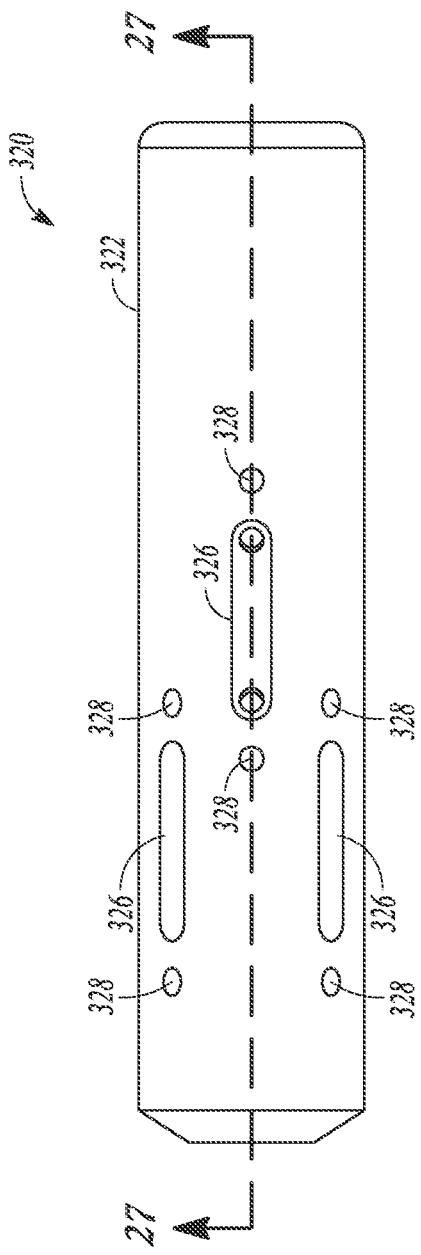
FIG. 26 is a side elevational view of the blade portion of FIG. 25.
Figure 27:
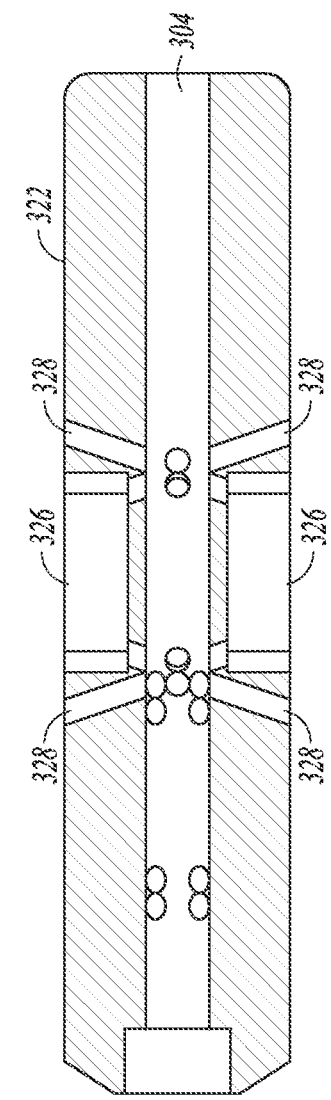
FIG. 27 is a cross-sectional view of the blade portion of FIG. 25, the cross section taken along line 27-27 in FIG. 26.
Figure 29:
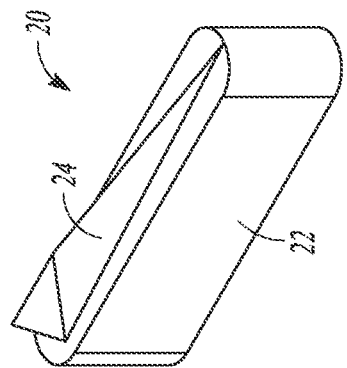
FIG. 29 is a perspective view of an example of a replaceable blade of a pipe splitter.

With reference to FIGS. 21-29, in an example, a scoring pilot segment 320 includes replaceable scoring blades 20 and is substantially similar to the example pilot segments 120, 220 described above. The scoring pilot segment 320 can be used instead of or in addition to the pilot segments 120, 220 of the pipe splitting apparatuses 100, 200 described above or can be used in another apparatus different from the pipe splitting apparatuses 100, 200. In an example, the scoring pilot segment 320 includes a cable passage 304 at a front end from which a cable or wire extends during a pulling operation. In an example, the scoring pilot segment 320 includes a outer surface 322. In a further example, the outer surface 322 is elongate. In a further example, the outer surface 322 is substantially tubular.

In various examples, the scoring pilot segment 320 includes one or more recesses 326 in the outer surface 322 configured to receive a corresponding number of blades 20 therein. In an example, the scoring pilot segment 320 includes two bands of recesses 326 having four recesses 326 in each band. In some examples, the scoring pilot segment 320 includes fewer than four recesses 326 or more than four recesses 326 in a band or includes more or less than two bands of recesses 326. The number of recesses 326 and bands of recesses 326 and corresponding blades 20 are dependent on various factors, including the material of the pipe or conduit being replaced, the properties of the ground through which the pipe or conduit being replaced is situated (such as the hardness, type of soil, amount of rocks, etc.), the material properties of the one or more blades 20 being used, etc. In an example, the blades 20 and corresponding recesses 326 are diametrically opposed to each other around the outer surface 322 of the scoring pilot segment 320.

In various examples, the one or more recesses 326 of the scoring pilot segment 320 are each configured to accept the bottom portion 22 of the blade 20. In an example, the bottom portion 22 is sized and shaped to fit within the recess 326 so that a top surface of the bottom portion is substantially flush with the outer surface 322 of the scoring pilot segment 320 and a cutting portion 24 of the blade 20 extends outwardly from the outer surface 326 of the scoring pilot segment 320. In an example, the one or more recesses 326 are elongate. In a further example, the one or more elongate recesses 326 are oriented to extend substantially longitudinally within the outer surface 322 of the scoring pilot segment 320. In another example, the one or more recesses 326 are oriented so that the cutting portion 24 of each of the blades 20 extends substantially longitudinally along the scoring pilot segment 320.

In an example, the one or more blades 20 fit snugly within the one or more recesses 326. In another example, the one or more blades 20 fit within the one or more recesses 326 with an amount of play between the blade 20 and the corresponding recess 326. In a further example, a hardenable material is disposed within the recess 326 and at least partially around the bottom portion 22 of the blade 20 disposed within the recess 326 to fix the blade 20 within the recess 326. The hardenable material, in an example, is configured to flow upon application. In an example, the hardenable material is configured to harden after application to secure the bottom portion 22 of the blade 20 within the recess 326 and fix the blade 20 to the pipe splitting apparatus 300. In an example, the hardenable material includes an adhesive. In another example, the hardenable material includes Loctite®. In still another example, the hardenable material includes an epoxy. In still another example, the hardenable material is solder. In this example, the solder is heated to apply the solder between the blade 20 and the recess 326. The solder acts to fix the blade 20 within the recess 326 as the solder cools and hardens. To remove the blade 20, the area of the blade 20 and recess 326 can be heated to soften the solder in order to facilitate the removal of the blade 20 from within the recess 326. In other examples, the hardenable material includes any substance capable of fixing or otherwise retaining the blade 20 within the recess 326.

In a further example, the blade 20 and the recess 326 are machined so that there is a tight tolerance between substantially vertical sidewalls of the recess 326 and corresponding substantially vertical sidewalls of the bottom portion 22 of the blade 20. With the blade 20 inserted within the recess 326, during pipe splitting operations, the sidewalls of the blade 20 bear against the sidewalls of the recess 326, such that a majority of the forces are borne by the abutting sidewalls of the blade 20 and the recess 326. In this way, the hardenable material acts primarily to hold the blade 20 within the recess 326 and bears little, if any, of the forces incurred by the blade 20 during pipe splitting operations. In an example, the bottom portion 22 of the blade 20 has a height and/or length sufficient to provide a sufficient surface area to bear the forces incurred during pipe splitting operations.

In this way, the hardenable material acts to retain each of the blades 20 within each of the recesses 326 during the useful life of each of the blades 20 or otherwise until a user decides to replace the one or more blades 20. Also, if one or more blades 20 happen to become loose prior to the user wanting to replace them, more hardenable material can be applied to the one or more blades 20 to again fix the one or more blades 20 within the corresponding recess 326.

After an amount of time, as the one or more blades 20 have reached a particular amount of wear, and/or if a blade of a different configuration is desired, the one or more blades 20 can be replaced without having to replace the entire scoring pilot segment 320. That is, each of the blades 20 to be replaced can be removed from the recess 326 and a new, unworn, or otherwise different blade 20 can be fixed within the recess 326 in order to continue usage of the scoring pilot segment 320. In an example, the scoring pilot segment 320 includes an elongate passage 328 extending through the outer surface 322 to a portion of the recess 326 to aid in dislodging or otherwise removing the blade 20 fixed within the recess 326. In an example, the elongate passage 328 extends to a bottom of the recess 326, such that a bottom of the bottom portion 22 of the blade 20 is accessible. In an example, the elongate passage 328 runs from the recess 326 to the outer surface 322 of the scoring pilot segment 320. In a further example, the opening of the elongate passage 328 is disposed in a portion of the outer surface 322 substantially opposed to the recess 326 to which the elongate passage 328 leads. In this way, an elongate tool, such as a rod, can be inserted through the elongate passage 328 to contact the bottom portion 24 of the blade 20 fixed within the recess 326. Force, such as percussive force from a hammer, pneumatic or manual, or constant force from a press, can be applied to break the bond of the hardenable material between the blade 20 and the recess 326 to dislodge and remove the blade 20 from within the recess 326. In an example, more than one elongate passage 328 are included through the scoring pilot segment 320 for each recess 326. In the example shown in FIGS. 21-28, two elongate passages 328 are included for each recess 326. In this way, the user is able to apply force the blade 20 at different locations along the bottom portion 22 to urge the blade 20 out of the recess 326. Once the blade 20 to be replaced is removed, another blade 20 can be fixed within the recess 326 using hardenable material.

Figure 32:
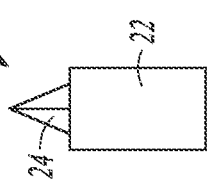
FIG. 32 is a front elevational view of the replaceable blade of FIG. 29.
Figure 31:
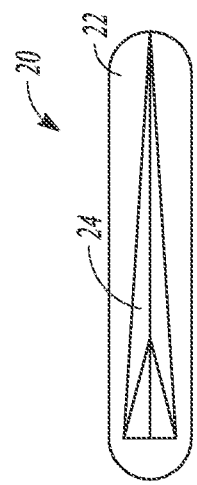
FIG. 31 is a top plan view of the replaceable blade of FIG. 29.
Figure 33:
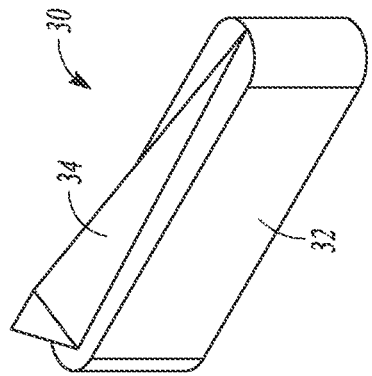
FIG. 33 is a perspective view of an example of a replaceable blade of a pipe splitter.
Figure 36:
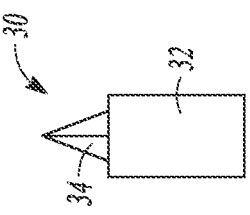
FIG. 36 is a front elevational view of the replaceable blade of FIG. 33.
Figure 35:
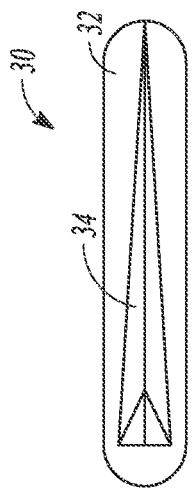
FIG. 35 is a top plan view of the replaceable blade of FIG. 33.
Figure 34:
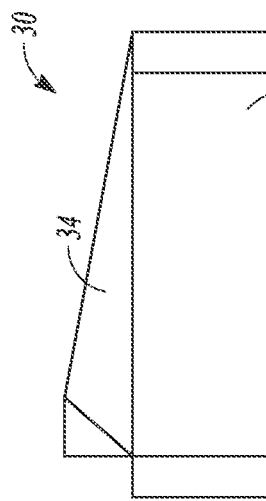
FIG. 34 is a side elevational view of the replaceable blade of FIG. 33.
Figure 37:
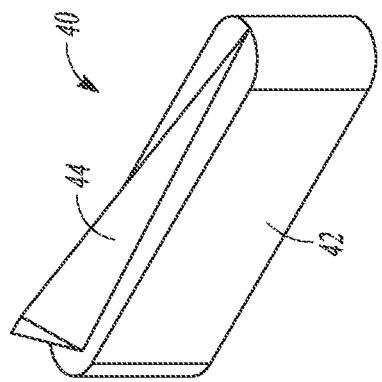
FIG. 37 is a perspective view of an example of a replaceable blade of a pipe splitter.
Figure 40:
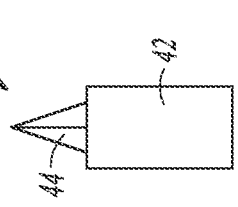
FIG. 40 is a front elevational view of the replaceable blade of FIG. 37.
Figure 39:
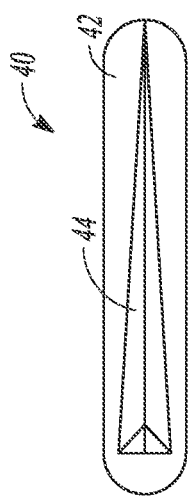
FIG. 39 is a top plan view of the replaceable blade of FIG. 37.
Figure 38:
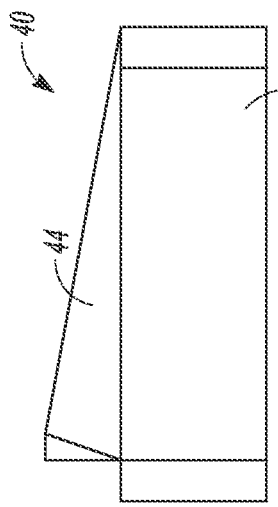
FIG. 38 is a side elevational view of the replaceable blade of FIG. 37.

Referring to FIGS. 19-20 and 31-40, variously configured blades 10, 20, 30, 40 are depicted. In some examples, the blades 10, 20, 30, 40 primarily vary from each other in the configurations of cutting portions 14, 24, 34, 44 of the blades 10, 20, 30, 40. In some examples, bottom portions 12, 22, 32, 42 of the blades 10, 20, 30, 40 are substantially similar to allow the bottom portions 12, 22, 32, 42 to fit within the recesses 126, 226, 326 of the pilot segments 120, 220, 320, as described above. The configurations of the cutting portions 14, 24, 34, 44 vary in several ways according to the task to be accomplished with the blade 10, 20, 30, 40 (for instance, splitting, scoring, etc.), the material properties of the pipe or conduit to be split, the properties of the ground surrounding the pipe or conduit to be split, etc. For instance, the blades 10, 20, 30, 40 shown differ from one another in height of the cutting portion 14, 24, 34, 44, width of the cutting portion 14, 24, 34, 44, and/or angle of a leading edge of the cutting portion 14, 24, 34, 44. It should be understood that configurations, other than the four configurations of blades 10, 20, 30, 40 shown and described herein, are contemplated herein, with varying widths, heights, and leading edge angles.

Although only the blades 10, 20 are described above as being replaceably engaged with the pilot segments 120, 220, 320, any of the blades 10, 20, 30, 40 shown and described herein, as well as any other configurations of blades not shown herein, are capable of being fixed within the recesses 126, 226, 326 of the pilot segments 120, 220, 320. That is, although the blade 10 is shown and described with respect to the pilot segments 120, 220, it is contemplated that the blades 20, 30, 40 be used with the pilot segments 120, 220, either instead of or in combination with the blade 10 or in combination with each other. Likewise, although the blade 20 is shown and described with respect to the scoring pilot segment 320, it is contemplated that the blades 10, 30, 40 be used with the scoring pilot segment 320, either instead of or in combination with the blade 20 or in combination with each other. That is, the pilot segment 120, 220, 320 can include all of the same configuration of blade 10, 20, 30, 40 or a combination of two or more configurations of blades 10, 20, 30, 40, depending upon the application for which the pilot segment 120, 220, 320 is being used.

Figure 30:
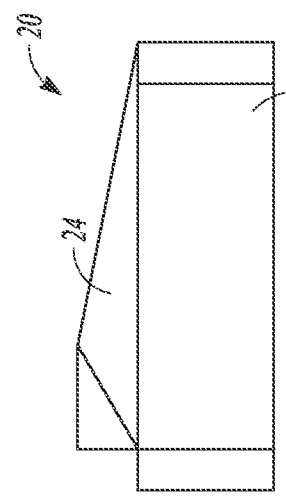
FIG. 30 is a side elevational view of the replaceable blade of FIG. 29.

In an example, with reference to FIGS. 1-40 and the above description, a method of use of replaceable blades 10, 20, 30, 40 includes inserting a bottom portion 12, 22, 32, 42 of the blade 10, 20, 30, 40 within a recess 126, 226, 326 of a pilot segment 120, 220, 320 of, for instance, a pipe splitting apparatus 100, 200. A hardenable material is applied within the recess 126, 226, 326 and at least partially around the bottom portion 12, 22, 32, 42 of the blade 10, 20, 30, 40. The hardenable material hardens after application to secure the bottom portion 12, 22, 32, 42 of the blade 10, 20, 30, 40 within the recess 126, 226, 326 and fix the blade 10, 20, 30, 40 to the pilot segment 120, 220, 320.

In an example, the hardenable material is removed from within the recess 126, 226, 326 to allow for a worn or otherwise undesirable blade 10, 20, 30, 40 to be removed from within the recess 126, 226, 326. A portion of a different blade 10, 20, 30, 40 can be inserted within the recess 126, 226, 326. The hardenable material is applied within the recess 126, 226, 326 and at least partially around the bottom portion 12, 22, 32, 42 of the different blade 10, 20, 30, 40. The hardenable material hardens after application to secure the bottom portion 12, 22, 32, 42 of the different blade 10, 20, 30, 40 within the recess and fix the different blade 10, 20, 30, 40 to the pilot segment 120, 220, 320. In this way, the undesirable blade 10, 20, 30, 40 can be replaced without having to replace the entire pilot segment 120, 220, 320. In an example, a bottom portion 12, 22, 32, 42 of an unused blade 10, 20, 30, 40 is inserted within the recess 126, 226, 326. Various reasons for replacing blades 10, 20, 30, 40 are contemplated. For instance, it may be desirable to replace a worn blade 10, 20, 30, 40 which has become ineffective due to the amount of wear or to replace a blade 10, 20, 30, 40 of a particular configuration with a blade 10, 20, 30, 40 of a different configuration.

In an example, an elongate member, such as a rod, is inserted within an elongate passage 128, 228, 328 through the pilot segment 120, 220, 320 to push the blade 10, 20, 30, 40 to be replaced out of the recess 126, 226, 326. In a further example, at least some of the hardened hardenable material is removed from within the recess 126, 226, 326 after removal of the blade 10, 20, 30, 40 to be replaced and before insertion of the other blade 10, 20, 30, 40 replacing the previous blade 10, 20, 30, 40.

As described with respect to the examples above, the replaceable blades 10, 20, 30, 40 of the pilot segment 120, 220, 320 allow for one or more blades 10, 20, 30, 40 of the pilot segment 120, 220, 320 to be replaced without having to replace the entire pilot segment 120, 220, 320. One or more blades 10, 20, 30, 40 can be replaced, for instance, if the one or more blades 10, 20, 30, 40 become worn, if a particular amount of usage time for the one or more blades 10, 20, 30, 40 has been reached, if a different configuration of blade 10, 20, 30, 40 is desired, etc. In this way, the replaceable blades 10, 20, 30, 40 are advantageous in that replacement of one or more blades 10, 20, 30, 40 can result in less downtime and/or less expense than the replacement of the entire pilot segment 120, 220, 320.

CONCLUSION

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A pipe splitting apparatus comprising:
    an expander cone;
    a splitter body coupled to the expander cone, the splitter body including a cable passage in a front end of the splitter body, wherein the splitter body includes a threaded connection on one or more ends to couple to other segments of a modular splitting apparatus, wherein the cable passage passes through the threaded connection; and a plurality of splitter blades located along a length of the splitter body and extending radially from the splitter body, each of the plurality of splitter blades including cutting portions;

wherein the splitter body includes threaded connections on both a front end and a back end to couple to other segments of a modular splitting apparatus.

2. The pipe splitting apparatus of claim 1, wherein the pipe splitting apparatus includes at least two opposed blades.

3. The pipe splitting apparatus of claim 1, wherein the pipe splitting apparatus includes four blades.

4. The pipe splitting apparatus of claim 1, wherein each blade in the plurality of splitter blades is secured to the splitter body within a recess with a hardenable material disposed within the recess and at least partially around a portion of each blade disposed within a respective recess.

5. The pipe splitting apparatus of claim 4, wherein the hardenable material includes an adhesive.

6. The pipe splitting apparatus of claim 4, wherein the hardenable material includes an epoxy.

7. The pipe splitting apparatus of claim 4, wherein the hardenable material includes a solder.

8. A pipe splitting apparatus comprising:

an expander cone;

a splitter body coupled to the expander cone, the splitter body including a cable passage in a front end of the splitter body, wherein the splitter body includes a threaded connection on one or more ends to couple to other segments of a modular splitting apparatus, wherein the cable passage passes through the threaded connection;

a plurality of splitter blades located along a length of the splitter body and extending radially from the splitter body, each of the plurality of splitter blades including cutting portions; and a pneumatic hammer coupled to the expander cone;

wherein the splitter body includes threaded connections on both a front end and a back end to couple to other segments of a modular splitting apparatus.

9. The pipe splitting apparatus of claim 8, wherein the pipe splitting apparatus includes at least two opposed blades.

10. The pipe splitting apparatus of claim 8, wherein the pipe splitting apparatus includes four blades.

11. The pipe splitting apparatus of claim 8, wherein each blade in the plurality of splitter blades is secured to the splitter body within a recess with a hardenable material disposed within the recess and at least partially around a portion of each blade disposed within a respective recess.

12. The pipe splitting apparatus of claim 11, wherein the hardenable material includes an adhesive.

13. The pipe splitting apparatus of claim 11, wherein the hardenable material includes an epoxy.

14. The pipe splitting apparatus of claim 11, wherein the hardenable material includes a solder.

15. The pipe splitting apparatus of claim 8, wherein a front segment is threaded in front of the splitter body and the expander cone is threaded in back of the splitter body.

16. The pipe splitting apparatus of claim 15, wherein the expander cone is further threaded to the pneumatic hammer.

* * * * *